B. A. GEURINK.
COMBINED FIRELESS COOKER AND GAS RANGE.
APPLICATION FILED DEC. 19, 1913.
1,207,394.
Patented Dec. 5, 1916.
2 SHEETS—SHEET 1.
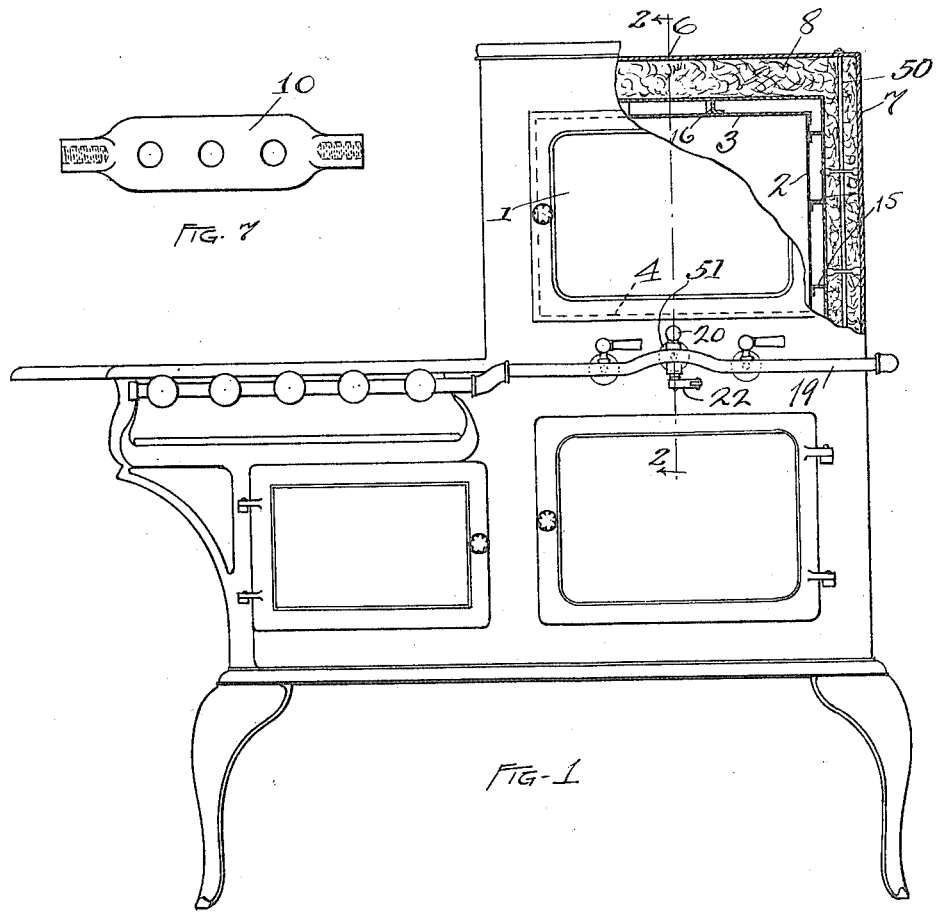
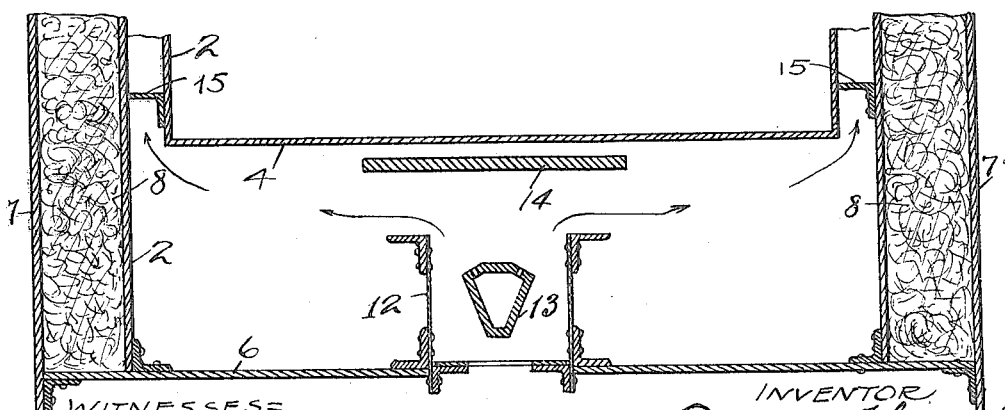

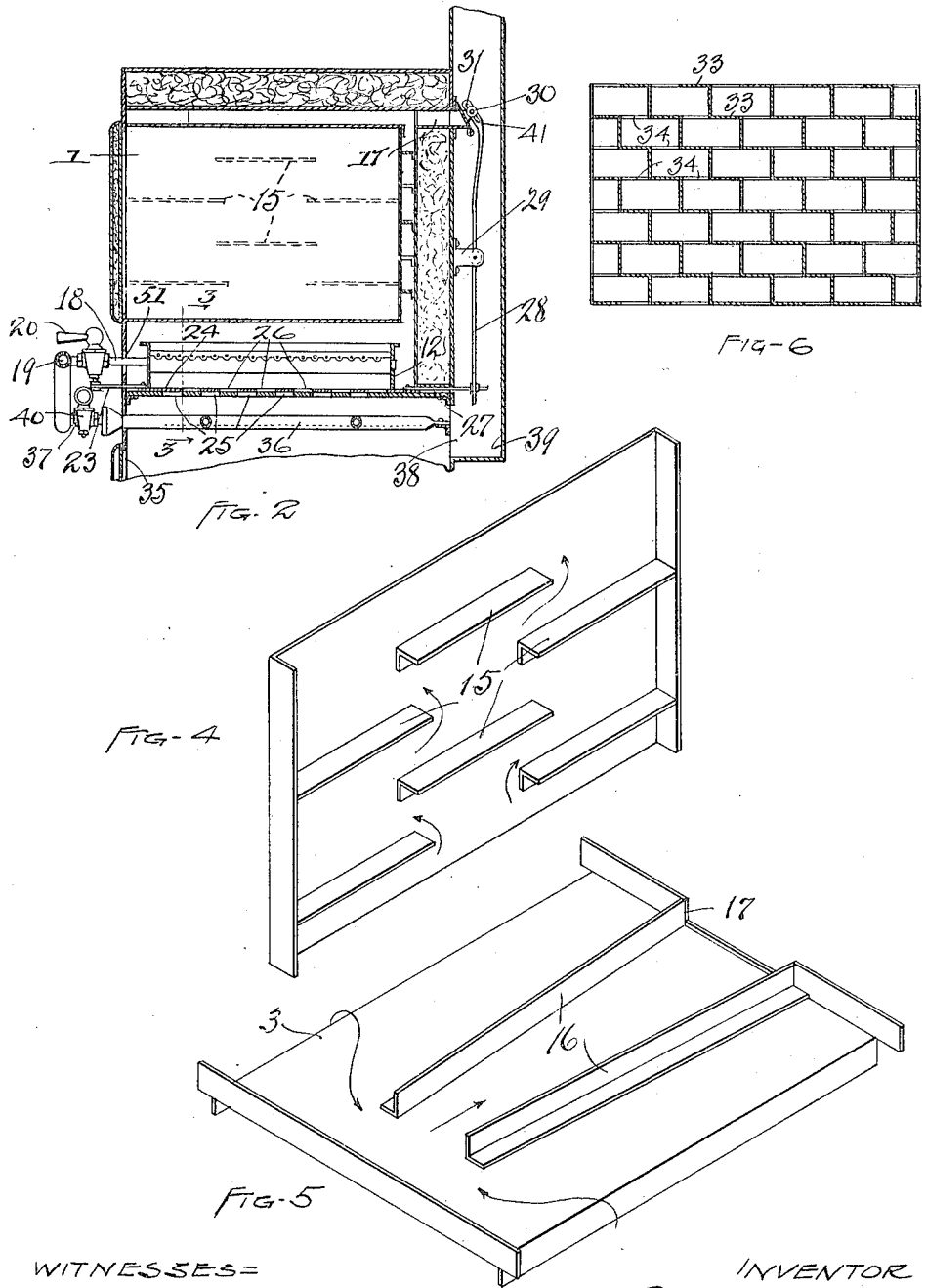

UNITED STATES PATENT OFFICE.

BERNARD A. GEURINK, OF EAST CLEVELAND, OHIO, ASSIGNOR TO THE TRENKAMP STOVE AND MANUFACTURING COMPANY, OF CLEVELAND, OHIO, A CORPORATION OF OHIO.

COMBINED FIRELESS COOKER AND GAS-RANGE.

1,207,394.     Specification of Letters Patent.     Patented Dec. 5, 1916.

Application filed December 19, 1913. Serial No. 807,659.

*To all whom it may concern:*

Be it known that I, BERNARD A. GEURINK, a citizen of the United States, and a resident of East Cleveland, county of Cuyahoga, and State of Ohio, have invented a new and useful Improvement in Combined Fireless Cookers and Gas-Ranges, of which the following is a specification, the principle of the invention being herein explained and the best mode in which I have contemplated applying that principle, so as to distinguish it from other inventions.

The present improvements relate to a combined gas stove or range and heat retaining chamber constructed to constitute what is now generally known to the trade and the public as a "fireless cooker," the construction being such that it may be used alternately either as a range or simply as a fireless cooker with equally good results.

Other features of my improvements relate to safety mechanism for preventing accidents which have been of quite common occurrence in fireless cookers of the types now in use.

To the accomplishment of these and related ends said invention then consists of the means hereinafter fully described and particularly pointed out in the claim.

The annexed drawings and the following description set forth in detail certain mechanism embodying the invention, such disclosed means constituting, however, but one of various mechanical forms in which the principle of the invention may be used.

Figure 1 is a front elevation of my invention partially sectioned to show certain details of the construction; Fig. 2 is a section on the line 2—2 in Fig. 1; Fig. 3 is a section on the line 3—3 in Fig. 2; Fig. 4 is a view in perspective of one of the walls of the heating chamber showing the baffling plates on the same; Fig. 5 is a similar view of the top wall of the heating chamber; Fig. 6 is a side elevation showing a modification of the distributing or baffling means in the casing; and Fig. 7 illustrates one of the spacing devices for maintaining the inner and outer casings in their proper positions.

From Fig. 1 it will be seen that the invention is preferably included as a part of the familiar gas stove or range, although not limited to use in this connection. A heating chamber 1 is provided which is inclosed on its sides 2, top 3 and bottom 4 by a casing 6 which is spaced from the chamber along the sides mentioned. This casing 6 comprises two spaced walls 7 between which is packed a suitable insulating material 8 such as asbestos, magnesia or mineral wool, either in pulpy or sheet form, the proper relation between the outer and inner walls being maintained by spacing devices 10 having a threaded socket at either end through which a suitable screw is passed, attaching the walls to the "spacer" the latter being centrally apertured to permit of the introduction of a rod 50 passing from the bottom of the casing to the top. In this way the casing can be tightly packed with the insulating material in case it is used in pulpy form without bulging the walls at any point.

In the center of the bottom of the outer casing 6 there is set an auxiliary casing or trough 12 in which is mounted a burner 13. Spaced from the top of this auxiliary trough, but beneath the heating chamber, is slidably mounted a deflecting plate 14, which may be moved for the purpose of lighting the burner and which serves to deflect the gas laterally so that it will pass over the bottom surface 4 of the heating chamber and then up the side walls 2 of the same. To secure a proper heating effect on the heating chamber, I provide a plurality of baffling plates 15 in the space between the side walls of the heating chamber and of the casing, such plates extending across this space in a staggered relation and causing the gas to pursue a zigzag or tortuous passage around the ends of said plates and then across the surface of the wall, repeating this operation until the gas has reached the top of the side walls when it is similarly directed by means of baffling plates 16 placed on top of the heating chamber, across the same, finally being permitted to discharge from the space between the top of the casing and the chamber through a vent or opening 17 at the rear of the same. In this way the heated gas is caused to pass over substantially the entire surface of the bottom, sides and top of the heating chamber before it is permitted to escape, the temperature thus secured being maintained by the heat insulating properties of the packing in the outer casing. The course of the gas is indicated by arrows in Figs. 4 and 5.

The burner 13 which is placed in the auxiliary or burner casing 12 is supplied with a suitable fuel gas by a pipe 18 passing through the front of the casing and connected externally of the same to a supply conduit 19. In this pipe there is mounted a valve controlling the admission of the gas, the valve being operated by means of a suitable handle 20 and being connected externally of its valve casing 21 by a short link 22 to a rod 23 passing through the front of the casing and connected to an apertured slide 24 reciprocably mounted upon the bottom of the burner casing 12. The latter is provided, in its bottom, with a plurality of equally spaced apertures 25 for the admission of air for the burner and the apertures 26 in the slide are of the same size and are similarly spaced. It will thus be seen that the slide in one position is adapted to entirely close the apertures in this casing, thus shutting off the supply of air from the burners and preventing the same from operating. In another position the apertures in the slide are adapted to register with the apertures in the casing, thus admitting air for the burners. Attached to the other end of such slide 24 is a rod 27 passing through the rear of the casing and loosely connected externally of the same to a lever 28 pivotally mounted on a lug 29 attached to the rear of the casing and pivotally and slidably attached at its upper end to a pin 30 which is connected to a valve or door 31 closing the vent 17 in the casing. The connection between this lever and the pin is by means of a slot 41 formed in the former in which such pin may move pivotally and slidably which is necessitated by the pivotal action required in the valve closing the vent.

The operation of the device will be seen from the foregoing description and it will be noted that when the gas valve is opened, supplying gas to the burner 13, the slide 24 registers with the apertures 25 in the auxiliary casing 12, thus supplying air while the valve 31 controlling the vent is open and permits passage through the casing of the heated gas produced at the burner. The device when so operating serves as a stove, in that food may be cooked in the heating chamber in the usual manner. When the temperature in the heating chamber has risen to a suitable point the gas valve may be closed, thus shutting off also the air supply and closing the vent, thus retaining in the casing 6 about the heating chamber 1, the hot gas which fills the space between the same. The device then operates as a fireless cooker to complete the cooking of whatever food is in the cooking chamber.

In order to light the burner, it is first necessary to operate the handle 20 controlling the flow of gas through the pipe 18. Movement of the handle simultaneously opens vent 17 and moves the slides 24 into position to permit air to flow up around the burner. The burner may then be lighted by the insertion, through the aperture 51, of a taper or match of sufficient length to extend past the end wall of the casing 12. By the positive connection between the various valves it is impossible for the operator to light the burner 13 when the vent 17 from the casing is closed, which often causes accidents by reason of the unburnt gas which has accumulated in this casing, which is then exploded. Similarly, it is impossible for a person to turn off the gas to cause operation of the device as a cooker and forget to close the vent 17 which would permit the escape of the heated gases and cause the device to be inoperative. By placing the insulating material outside of the space for the heated gas between the casing and the chamber this double operation is secured, which it would be impossible to attain were the insulating material placed inside of the space for the heated gases. The burner construction which is here used has been found to give an extremely efficient heating result, although the features of this burner form in themselves no part of the present invention, a separate application having been filed on this feature of the construction.

In Fig. 6 an alternative means for distributing the heated gas is shown. It consists of parallel plates 33 provided with rows of apertures 34 placed in staggered relation. This plate will be placed between the walls of the casing 6 and chamber 1 and will operate to break up the gas and distribute it across the wall surface of the chamber 1. Other suitable mechanism may be provided to accomplish this same result if desired. Beneath the heating chamber 1 is disposed an oven 35 provided in its upper portion with downwardly directed burners 36 which are supplied with gas from the pipe 18 by means of distributing pipes 37 controlled by valves 40. The oven 35 is provided with a vent 38 which opens into a conduit 39 inclosing the operating mechanism for the valve 31 and vent 17, such conduit being extended to any suitable pipe or chimney. It will be seen that the oven may be operated irrespective of the use to which the heating chamber 1 is being put, although the two chambers discharge into the same passage.

Other modes of applying the principle of my invention may be employed instead of the one explained, change being made as regards the mechanism herein disclosed, provided the means as claimed herein or the equivalent of such stated means be employed.

I therefore particularly point out and distinctly claim as my invention:—

In a stove, the combination of an outer casing; a heating chamber partially inclosed therein and spaced therefrom, said casing having a vent in the back of the same adjacent to the top; a valve controlling such vent; an auxiliary casing open at its top and mounted in said first-named casing, said auxiliary casing extending from front to back across said first-named casing and having a plurality of spaced apertures in its bottom for the admission of air; a burner mounted in said auxiliary casing; a gas supply conduit connected to said burner; a valve controlling said conduit; a shutter slidably mounted upon the bottom of said auxiliary casing and adapted to control such apertures; connections between said shutter and said valve in said conduit; and other connections between the rear end of said shutter and said valve controlling such vent, said last-named connections including pivotally connected rods, one of such rods being connected to said shutter and the other being pivotally and slidably connected to said valve controlling such vent; said connections being adapted to effect simultaneous opening and closing of said valves and said shutter.

Signed by me, this 13th day of December, 1913.

BERNARD A. GEURINK.

Attested by—
H. B. Fay,
A. L. Gill.

Copies of this patent may be obtained for five cents each, by addressing the "Commissioner of Patents, Washington, D. C."